(12) United States Patent
Silveri et al.

(10) Patent No.: US 6,805,647 B2
(45) Date of Patent: Oct. 19, 2004

(54) HYBRID ELECTRIC VEHICLE AUXILIARY OIL PUMP

(75) Inventors: Andrew John Silveri, Royal Oak, MI (US); Marvin Paul Kraska, Dearborn, MI (US); Walter Joseph Ortmann, Saline, MI (US)

(73) Assignee: Ford Motor Company, Dearborn, MI (US)

( * ) Notice: Subject to any disclaimer, the term of this patent is extended or adjusted under 35 U.S.C. 154(b) by 12 days.

(21) Appl. No.: 10/065,242

(22) Filed: Sep. 27, 2002

(65) Prior Publication Data

US 2004/0063533 A1 Apr. 1, 2004

(51) Int. Cl.[7] ................................................. F16H 3/72
(52) U.S. Cl. ............................... 475/4; 475/122; 477/3
(58) Field of Search ............................ 477/3, 7; 475/4, 475/122, 123

(56) References Cited

U.S. PATENT DOCUMENTS

| | | | |
|---|---|---|---|
| 6,110,072 A | * | 8/2000 | Harada et al. ............... 477/157 |
| 6,176,808 B1 | * | 1/2001 | Brown et al. ............... 477/3 X |
| 6,183,389 B1 | * | 2/2001 | Tabata ........................... 477/5 |
| 6,390,947 B1 | * | 5/2002 | Aoki et al. .................... 477/3 |
| 6,457,351 B1 | * | 10/2002 | Yamamoto ................... 73/116 |
| 6,647,326 B2 | * | 11/2003 | Nakamori et al. ............ 701/22 |

FOREIGN PATENT DOCUMENTS

JP    2003120357    * 4/2003

* cited by examiner

Primary Examiner—Ha Ho
(74) Attorney, Agent, or Firm—David B. Kelley

(57) ABSTRACT

An automatic transmission for a hybrid electric vehicle where an engine is shut down during vehicle stops to improve fuel economy. The automatic transmission includes a main pump that is driven off of a transmission input shaft, and an electronically driven auxiliary pump. A shut down shuttle valve switches a hydraulic circuit connection from the main pump to the auxiliary pump for a low-reverse clutch and a forward clutch when the vehicle stops in drive or low gear. A pressure transducer, controller and steady state relay allow for closed loop feedback to control the auxiliary pump in order to assure sufficient hydraulic pressure while minimizing power consumption.

9 Claims, 3 Drawing Sheets

HYBRID ELECTRIC VEHICLE AUXILIARY OIL PUMP

BACKGROUND OF INVENTION

The present invention relates to an automatic transmission in a hybrid electric vehicle and more particularly to an automatic transmission in a hybrid electric vehicle where the engine shuts down when the vehicle stops.

Hybrid electric vehicles are vehicles that have a hybrid powertrain, typically including an electric drive system that is packaged in parallel with a conventional internal combustion engine. For hybrid electric vehicles with an internal combustion engine and an automatic transmission, it is preferable if the engine shuts down while the vehicle is stopped. By stopping the engine, the fuel economy of the vehicle is improved. However, the main transmission oil pump, which is typically driven by the rotation of the transmission input shaft, will stop pumping oil when the engine stops. But there is still a need for enough oil pressure to keep the clutches that are active in first gear (forward and low-reverse) stroked (i.e. engaged), so that the vehicle can immediately provide torque to the drive wheels when the vehicle operator demands a vehicle launch. If the oil pressure is not present, then the vehicle will not begin moving until the oil pressure can again build up to stroke the needed clutches. This would create an unacceptable delay for the vehicle operator.

Thus, it is desirable to have a hybrid electric vehicle with an automatic transmission, where the engine can shut down during a vehicle stop, but that also allows for immediate torque output when the vehicle operator demands a vehicle launch.

SUMMARY OF INVENTION

In its embodiments, the present invention contemplates a transmission for a hybrid electric vehicle. The transmission includes an input shaft with a main transmission fluid pump drivingly connected thereto, an electronically controlled hydraulic shift system, a low-reverse clutch and a forward clutch connected to the hydraulic shift system, and an electronically driven fluid pump. The transmission also includes a shut down shuttle valve operatively engaging the electrically driven fluid pump, the low/reverse clutch and the forward clutch and switchable to selectively engage and disengage the electronically driven pump from the hydraulic shift system.

The present invention further contemplates a method of operating a hydraulic system in an automatic transmission of a hybrid electric vehicle, with the transmission including an input shaft and a main pump for generating pressure in a hydraulic fluid when the input shaft is rotating, the method comprising the steps of: detecting that a rotational velocity of the transmission input shaft is below a predetermined threshold, and that a gear shift is in one of a drive and a low position; actuating an auxiliary pump to boost a pressure of the hydraulic fluid; operating the auxiliary pump to increase the hydraulic fluid pressure to a desired line pressure; hydraulically connecting the auxiliary pump to a low-reverse clutch and a forward clutch; and hydraulically disconnecting the main pump from the low-reverse clutch and the forward clutch.

An embodiment of the present invention allows for the addition of an electronically controllable transmission oil auxiliary pump, and a shut-down shuttle valve, so that there is enough oil pressure at the forward and the low-reverse clutches to allow for a quick vehicle launch, even when the vehicle engine is shut down while the vehicle is stopped.

An advantage of the present invention is that the internal combustion engine can shut down during a vehicle stop, thus improving the fuel economy of the hybrid electric vehicle.

Another advantage of the present invention is that the hybrid electric vehicle can begin transmitting torque to the drive wheels immediately upon driver demand for the torque, even when the engine is shut down during a vehicle stop.

A further advantage of the present invention is that the hydraulic pressure needed to obtain an immediate vehicle launch after the vehicle is stopped is produced with minimal additional hardware versus a conventional automatic transmission, and with minimal parasitic losses from generating the needed hydraulic pressure.

DETAILED DESCRIPTION

Figure 1:
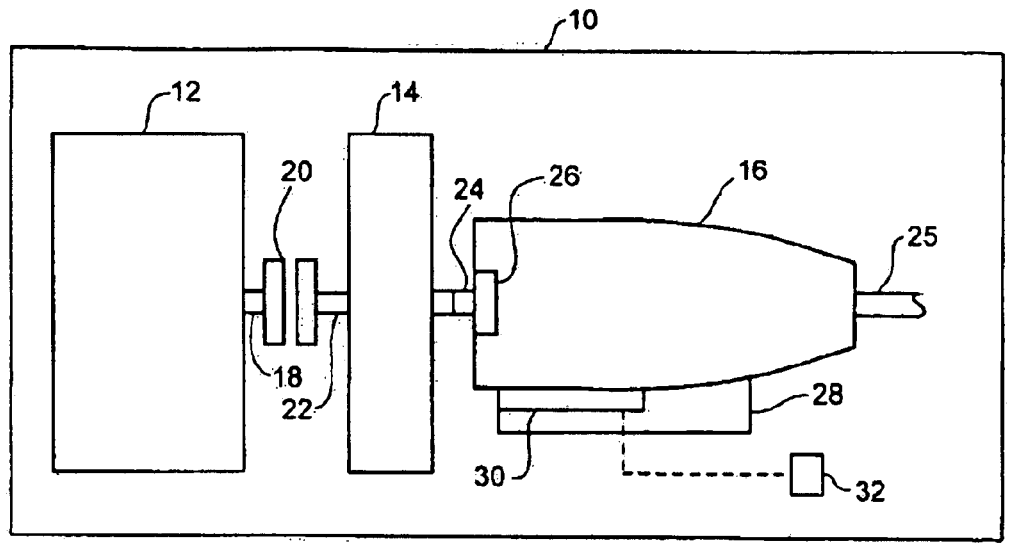
FIG. 1 is a schematic diagram of a portion of a hybrid electric vehicle powertrain in accordance with the present invention.

FIG. 1 illustrates a hybrid electric vehicle 10 that includes an internal combustion engine 12, a electric traction motor 14 and an automatic transmission 16. The engine 12 includes a crankshaft 18 that connects, via a clutch 20, to a main shaft 22 of the traction motor 14. The traction motor main shaft 22 also connects to an input shaft 24 of the transmission 16, which connects, via the transmission gears (not shown), to a transmission output shaft 25. A main transmission oil pump 26 mounts to and is driven by the input shaft 24. The transmission 16 also includes an oil pan 28 and a valve body 30. Electrically connected to components within the valve body 30 is a transmission control module 32. The electrical connections are illustrated herein by dashed lines. The transmission control module 32 controls the shifting of the transmission 16, via the valve body 30.

Figure 2:
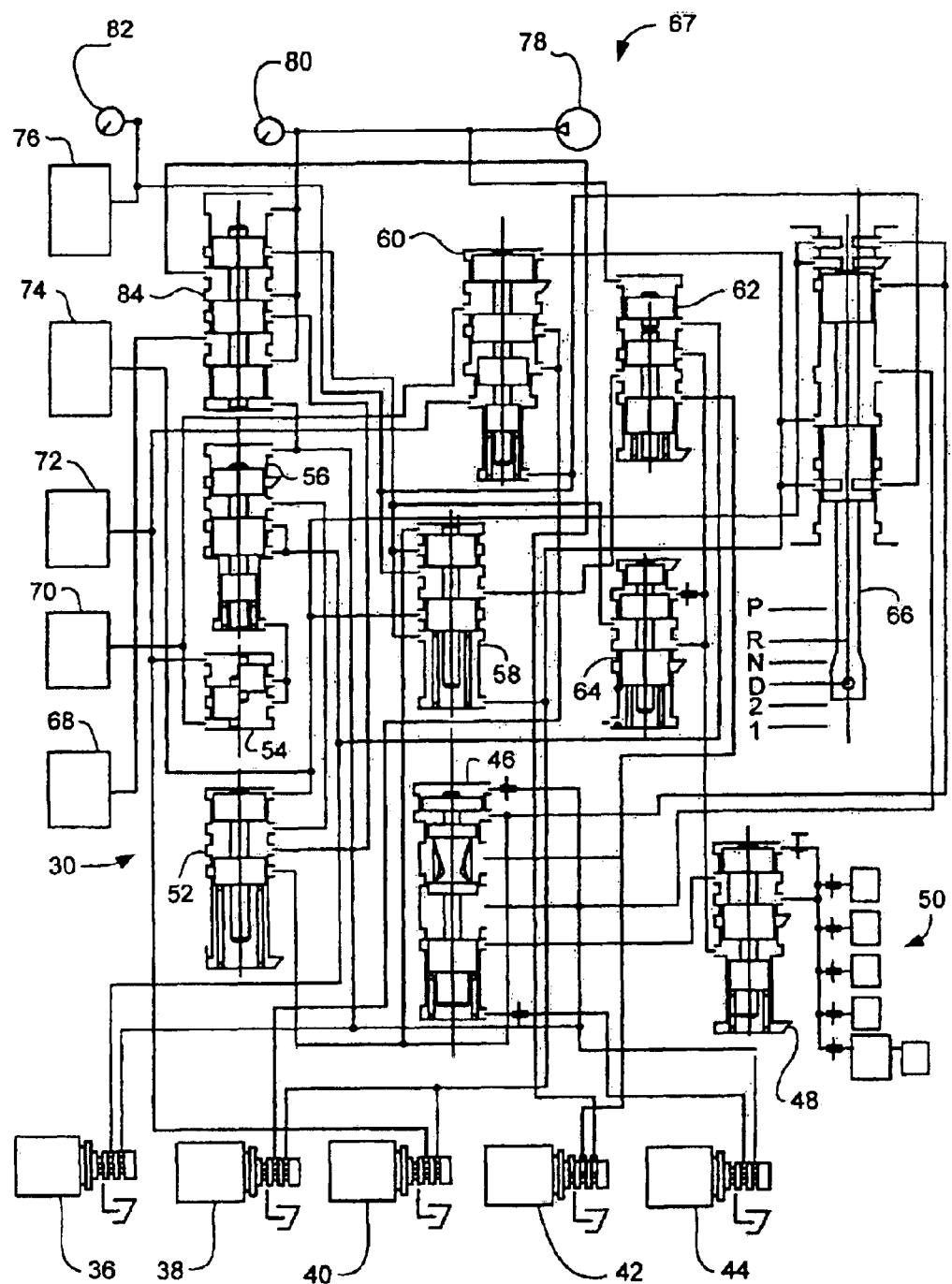
FIG. 2 is a schematic diagram of a valve body and clutches for an automatic transmission in accordance with the present invention.

FIG. 2 shows a schematic diagram of the valve body 30 and hydraulic connections to clutches and bands in the transmission. The valve body 30 includes a low-reverse solenoid 36, a two/four solenoid 38, a direct solenoid 40, a forward-reverse solenoid 42, and an EPC solenoid 44. The actuation of these solenoids is electronically controlled by the transmission control module. The valve body 30 also includes a series of valves, including a main hydraulic pressure regulator valve 46 that regulates the hydraulic pressure in the system, and a lube regulator valve 48 that regulates the flow of hydraulic fluid to different locations 50 in the transmission that require lubrication. A low-reverse shuttle valve 52, two/four direct shuttle valve 54, priority one valve 56, forward-reverse shuttle valve 58, priority two valve 60, launch shuttle valve 62, and pilot regulator valve 64 are also located in the valve body 30. There is also a manual valve 66, the position of which is controlled by the vehicle operator when he moves the transmission selector lever in the passenger compartment (not shown). The vehicle operator can shift into the usual positions of first gear (1), second gear (2), drive (D), neutral (N), reverse (R) and park (P), as indicated in FIG. 2.

The solenoids and valves selectively interconnect through various hydraulic fluid passages to form a hydraulic circuit 67. This circuit 67 controls the shifting of the transmission by applying or releasing hydraulic pressure on a series of hydraulic clutches and bands in the transmission. The transmission includes a low-reverse clutch 68, a two/four band 70, a direct clutch 72, a reverse clutch 74, and a forward clutch 76.

The transmission also includes an electrically driven, auxiliary pump 78, a pump outlet pressure transducer 80, and a forward clutch pressure transducer 82, which are hydraulically linked to a shut down shuttle valve 84 in the valve body 30. The shut down shuttle valve 84 is interposed in the hydraulic circuit 67 between the low-reverse shuttle valve 52 and the low-reverse clutch 68, and between the forward-reverse shuttle valve 58 and the forward clutch 76. The line pressure produced by the main transmission oil pump connects to one side of the shut down shuttle 84, while the auxiliary pump pressure is connected to the other side of the shut down shuttle 84. When the line pressure is higher, the shuttle 84 moves so that the low-reverse clutch 68 is in hydraulic communication with the low reverse shuttle valve 52, and the forward clutch 76 is in hydraulic communication with the forward-reverse shuttle valve 58. When the auxiliary pump pressure is higher, the shuttle moves so that the low-reverse clutch 68 and the forward clutch 76 are selectively in hydraulic communication with the auxiliary pump 78.

Figure 3:
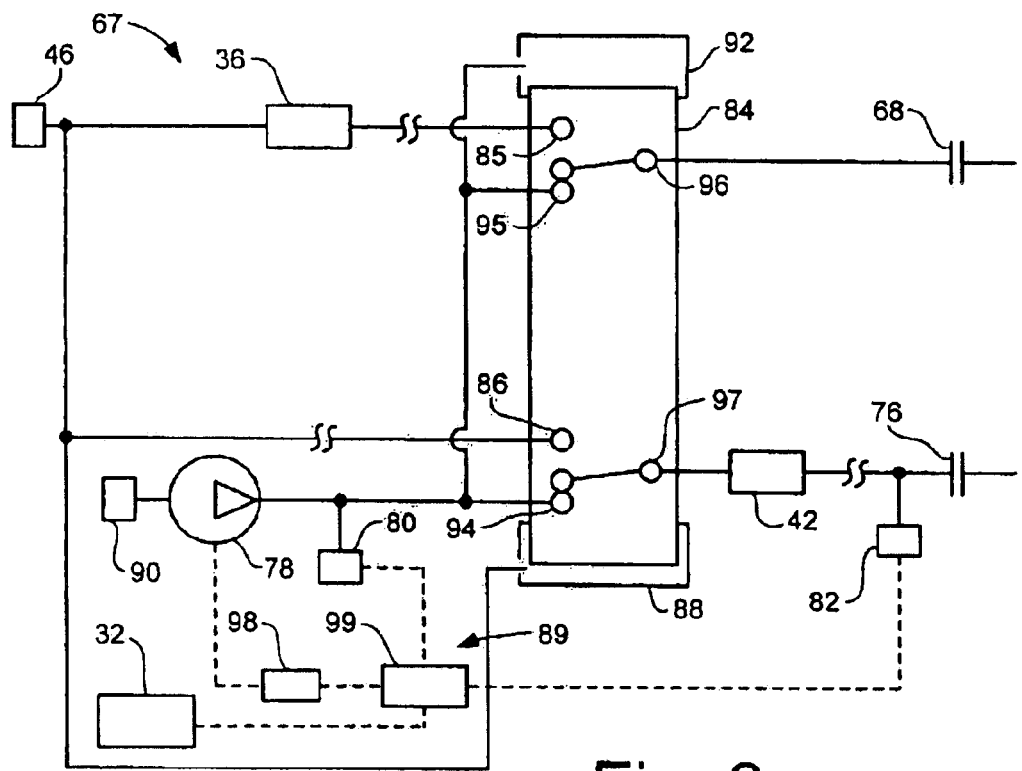
FIG. 3 is a schematic diagram of electronic and hydraulic circuits for an auxiliary pump in accordance with the present invention.

FIG. 3 better isolates the hydraulic circuit 67 and the electronic circuit 89 for the auxiliary pump 78 from the rest of the hydraulic circuit shown in FIG. 2. The main hydraulic pressure regulator valve 46 supplies a hydraulic line pressure to the low-reverse solenoid 36 (and ultimately to an inlet 85 to the shut down shuttle 84), to another inlet 86 of the shut down shuttle 84, and to one end 88 of the shut down shuttle 84 for actuating the shuttle 84. The inlet of the auxiliary pump 78 is connected to a source 90 of hydraulic oil. The auxiliary pump outlet is connected to a pair of inlets 94, 95 of the shut down shuttle 84, and to the other end 92 of the shut down shuttle 84 for actuating the shuttle 84.

The position of the shut down shuttle is determined by the higher of the line pressure and the auxiliary pump pressure. The inlet 85 connects to an outlet 96 and the inlet 86 connects to an outlet 97 when the line pressure is higher than the auxiliary pump pressure, and the inlet 95 connects to the outlet 96 and the inlet 94 connects to the outlet 97 when the auxiliary pump pressure is higher. So effectively, when the pressure from the auxiliary pump 78 is higher than the line pressure, the normal hydraulic circuits to both the forward clutch 76 and the low-reverse clutch 68 are interposed, and the shut down shuttle 84 provides a new source of hydraulic pressure for actuating the low-reverse clutch 68 and the forward clutch 76.

The auxiliary pump 78 is electrically driven by a steady state relay 98 based on pulse width modulated signals from a pump controller 99, which is in communication with the pressure transducers 80, 82 and the transmission control module 32. This electronic circuitry 89 allows for a constant pump pressure from the auxiliary pump 78. While the pump controller 99 and transmission control module 32 are shown separately, the pump controller 99 can be integrated into the transmission control module 32, if so desired.

Figure 4:
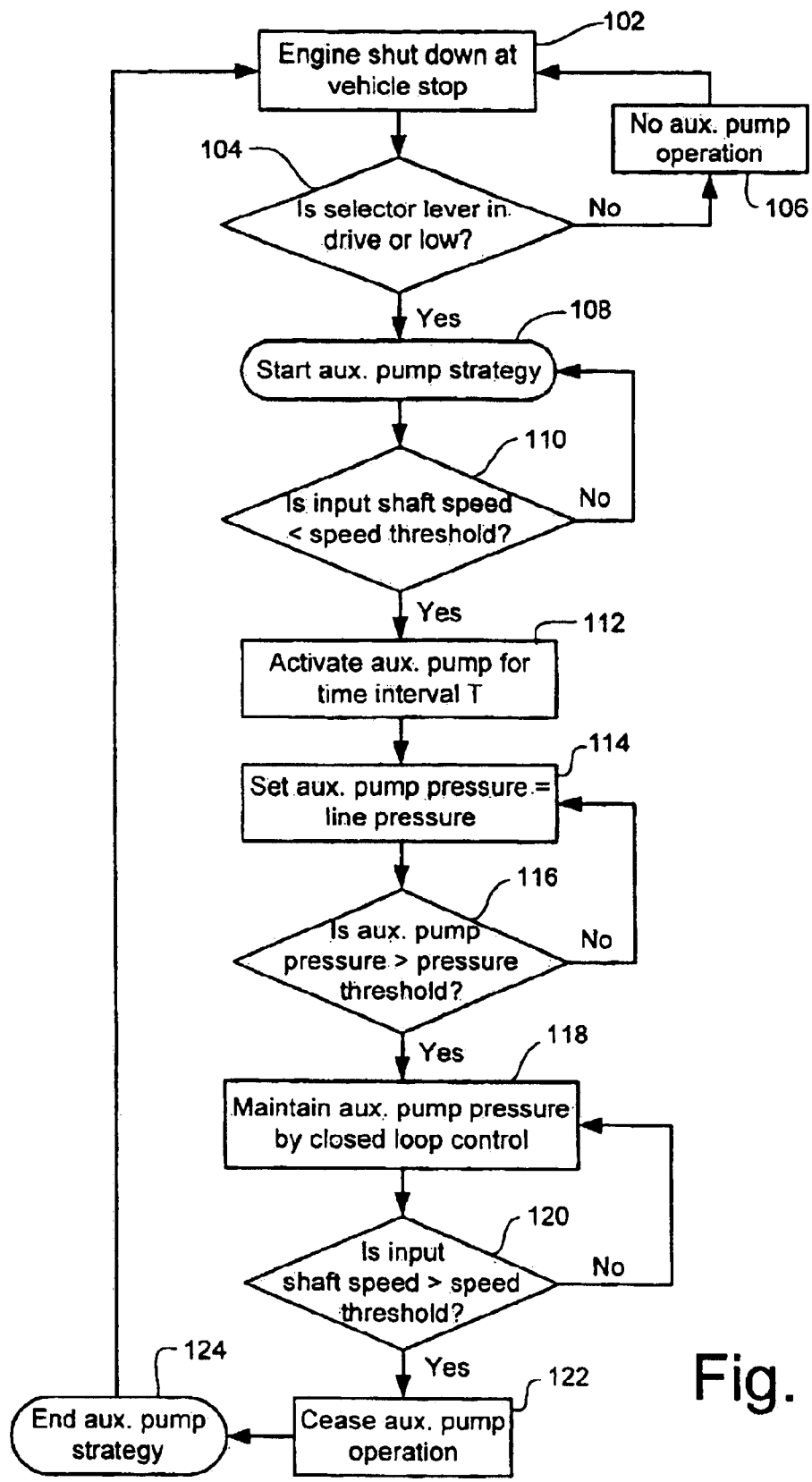
FIG. 4 is a flow chart illustrating a process for operating an auxiliary pump in a hybrid vehicle, in accordance with the present invention.

FIG. 4 shows a flow chart for the process of controlling the auxiliary pump 78, hydraulic circuit 67, and electrical circuit 89, of FIGS. 1–3. When the hybrid electric vehicle 10 comes to a stop, the engine 12 shuts down, block 102. Next, it is determined if the transmission selector lever is in drive or low, block 104. If not, then the auxiliary pump strategy is not started, block 106. If it is in drive or low, then the auxiliary pump strategy is initiated, block 108. It is then determined if the speed of the transmission input shaft 24 is less than a predetermined threshold speed, block 110. If it is not, then the strategy begins again. If the speed is less than the threshold, then the auxiliary pump 78 will be activated in open loop mode for a predetermined time interval T, block 112. This open loop pump operation is used to prime the auxiliary pump 78. Then, when the time interval T has expired, the auxiliary pump 78 is operated at a rate that will produce a pressure that is about equal to the line pressure for normal transmission operation, block 114. During this process, as the pressure from the auxiliary pump 78 begins to exceed the line pressure, the pressure difference will automatically cause the shut down shuttle 84 to shift. This shift will change the hydraulic circuit 67 so that the low-reverse clutch 68 and the forward clutch 76 will be actuated by the pressure created from the auxiliary pump 78.

The auxiliary pump continues to run in open loop mode until a predetermined pressure threshold is exceeded, block 116. The pressure produced by the auxiliary pump is determined by inputs from the pump outlet pressure transducer, and the forward clutch pressure transducer. Once the pressure threshold is exceeded, the auxiliary pump is operated with closed loop control, block 118, in order to maintain the constant desired pressure. The constant desired pressure from the auxiliary pump 78 is preferably controlled to a level that is below that of the normal hydraulic pressure resulting from the operation of the main pump. This constant pressure is maintained so that the low-reverse clutch and the forward clutch remain engaged, ready for an immediate vehicle launch. By employing the pressure transducers 80, 82 to allow for closed loop control of the hydraulic pressure from the auxiliary pump 78, the hydraulic pressure supplied for these clutches can be maintained at the lowest level required to maintain clutch engagement. Thus, the power consumption of the auxiliary pump 78 can be minimized.

Once the vehicle launches, then the transmission input shaft will begin driving the main transmission oil pump, which will then begin building line pressure again. When the transmission input shaft speed exceeds a predetermined threshold speed, block 120, the auxiliary pump will be turned off, block 122, which will end the auxiliary pump strategy, block 124, until the vehicle again stops. Of course, as the transmission input shaft gains speed during vehicle launch, the main transmission oil pump will increase the line pressure. Thus, in turn, the shut down shuttle will be shifted to disconnect the auxiliary pump from the hydraulic circuit and connect the low-reverse clutch and the forward clutch to the normal operating hydraulic circuit for the transmission.

While certain embodiments of the present invention have been described in detail, those familiar with the art to which this invention relates will recognize various alternative designs and embodiments for practicing the invention as defined by the following claims.

What is claimed is:

1. A transmission for a hybrid electric vehicle comprising:
    an input shaft with a main transmission fluid pump drivingly connected thereto;
    an electronically controlled hydraulic shift system;

a low-reverse clutch and a forward clutch connected to the hydraulic shift system;

an electronically driven fluid pump having a fluid output; and a pressure transducer operatively engaging the fluid output;

a controller in communication with the pressure transducer, and a solid state relay electronically connected to and drivable by the controller, and with the electronically driven pump electronically connected to and drivable by the solid state relay;

a shut down shuttle valve operatively engaging the electrically driven fluid pump, the low/reverse clutch and the forward clutch and switchable to selectively engage and disengage the electronically driven pump from the hydraulic shift system.

2. The transmission of claim 1 further including a forward-reverse solenoid and a forward-reverse shuttle, and the shut down shuttle has a first position where the forward-reverse solenoid and forward reverse shuttle are exposed to fluid pressure from the main transmission fluid pump and a second position where the forward-reverse solenoid and forward-reverse shuttle are exposed to fluid pressure from the electronically driven fluid pump.

3. The transmission of claim 2 wherein the shut down shuttle is shiftable from the first position to the second position when the fluid pressure produced by the electronically driven fluid pump exceeds the fluid pressure produced by the main transmission fluid pump.

4. The transmission of claim 3 wherein the shut down shuttle is shiftable from the second position to the first position when the fluid pressure produced by the electronically driven fluid pump is less than the fluid pressure produced by the main transmission fluid pump.

5. The transmission of claim 2 wherein the shut down shuttle is shiftable from the second position to the first position when the fluid pressure produced by the electronically driven fluid pump is less than the fluid pressure produced by the main transmission fluid pump.

6. The transmission of claim 1 further including a second pressure transducer operatively engaging the forward clutch.

7. A hybrid powertrain for a vehicle comprising:

an internal combustion engine;

a traction motor drivingly connected to the engine; and a transmission having an input shaft, with a main transmission fluid pump drivingly connected thereto, an electronically controlled hydraulic shift system, a low-reverse clutch and a forward clutch connected to the hydraulic shift system, an electronically driven fluid pump having a fluid output, a pressure transducer operatively engaging the fluid output, a controller in communication with the pressure transducer, a solid state relay electronically connected to and drivable by the controller, with the electronically driven pump electronically connected to and drivable by the solid state relay, and with a shut down shuttle valve operatively engaging the electrically driven fluid pump, the low/reverse clutch and the forward clutch and switchable to selectively engage and disengage the electronically driven pump from the hydraulic shift system.

8. The hybrid powertrain of claim 7 further including a forward-reverse solenoid and a forward-reverse shuttle, and the shut down shuttle has a first position where the forward-reverse solenoid and forward reverse shuttle are exposed to fluid pressure from the main transmission fluid pump and a second position where the forward-reverse solenoid and forward-reverse shuttle are exposed to fluid pressure from the electronically driven fluid pump.

9. The hybrid powertrain of claim 8 wherein the shut down shuttle is shiftable from the first position to the second position when the fluid pressure produced by the electronically driven fluid pump exceeds the fluid pressure produced by the main transmission fluid pump.

* * * * *